United States Patent [19]
Thurlow

[11] Patent Number: 5,264,856
[45] Date of Patent: Nov. 23, 1993

[54] SYSTEM AND METHOD FOR DETECTING RADIANT ENERGY REFLECTED BY A LENGTH OF WIRE

[75] Inventor: Norman E. Thurlow, Severna Park, Md.

[73] Assignee: Westinghouse Electric Corp., Pittsburgh, Pa.

[21] Appl. No.: 847,386

[22] Filed: Mar. 6, 1992

[51] Int. Cl.⁵ .................. G01S 13/04; H01Q 21/06
[52] U.S. Cl. ................................. 342/188; 342/65; 342/179
[58] Field of Search .............. 342/65, 179, 188

[56] References Cited

U.S. PATENT DOCUMENTS 4,193,074 3/1980 Schwartz et al. .

Primary Examiner—T. H. Tubbesing

[57] ABSTRACT

A method and system for detecting wire in a terrain avoidance, terrain following, or a terrain obstacle system. Radiant energy pulses orthogonally polarized are alternately transmitted. Selected dimensions of a full scattering matrix of adjacent reflected pulses for a particular range are collected and combined to form a null matrix. A null matrix with the two reflected pulses being within a predetermined distance from one another is detected as a wire.

12 Claims, 3 Drawing Sheets

SYSTEM AND METHOD FOR DETECTING RADIANT ENERGY REFLECTED BY A LENGTH OF WIRE

BACKGROUND OF THE INVENTION

1. Field of Invention

The present invention relates to terrain following, terrain avoidance, and obstacle warning radar; and more particularly to a method and system for detecting radiant energy reflected by a wire located above the terrain being observed.

2. Discussion of Related Art

Terrain following, terrain avoidance, or obstacle warning radar system, referred to hereinafter collectively or individually as a terrain observation system, is typically mounted on aircraft and scan the earth's surface usually in the direction of aircraft travel for determining the elevation or range of the terrain, including buildings or other obstacles, from the radar platform.

Such systems may be either real aperture or synthetic aperture radar systems with pulses of high frequency and short duration and high repetition rate in order to provide a high resolution range for the observer. In such systems, it is common to employ pulse compression for obtaining a higher range resolution for the received echoes while permitting the transmission of longer pulses to provide more power to the radiated energy.

When the radiated energy of the transmitter strikes the surface of the earth, and other obstacles between the surface and the radar platform, the energy is reflected or scattered in all directions and with varying amplitudes which are a function of the shape of the object or radar cross-section, the beam angle, frequency, polarization of the return signal, and the reflection coefficient of the target material. The radar cross section of a target is the area intercepting the radiated energy or power, which produces an echo at the receiver corresponding to that from the target. In most instances, the radar cross-section is proportional to the physical area of the reflecting object.

Wire, which is located at various distances above the terrain, is unable to be reliably detected by the typical terrain observance system because it competes with a composite of reflecting elements within a unit of volume, whose size is determined by range resolution, and azimuth elevation beamwidth.

Wire provides a significant radar cross-section that is readily detected from other objects, and has maximum reflection at times when it is oriented perpendicular to the line-of-sight of the radar, or in other words parallel to the polarization of the transmitted beam. However, its reflectivity decreases rapidly as its angle of orientation changes from extending parallel to the polarization plane to an orientation orthogonal to the polarization plane, at which orientation it is effectively transparent to the radar beam.

For the most part, wire is usually strung parallel to the general contour of the terrain. This, of course, provides the same orientation relative to the terrain being observed. The actual orientation of wire relative to the radar platform, however, depends on the direction of its longitudinal axis relative to the direction of travel of the aircraft with respect to the earth's surface. Thus, the reduced radar cross-section of wire at angles that are not parallel to the polarization of the beam is many times too low relative to surrounding objects, to enable measurement of the wire height with the required accuracy.

SUMMARY OF INVENTION

One of the objects of the present invention is to provide a method and system of detecting a length of wire in a terrain observed by a radar system.

Another object of the present invention is to provide a method and system for identifying wires in a terrain observing system without requiring an accurate height measurement.

Additional objects and advantages of the invention will be set forth in part in the description which follows, and in part will be obvious from the description, or may be learned by practice of the invention. The objects and advantages of this invention may be realized and obtained by means of the instrumentalities and combinations particularly pointed out in the appended claims.

To achieve the objects, and in accordance with the purpose of the invention, as embodied and broadly described herein, the method of detecting radiant energy reflected by a length of wire, comprises generating electromagnetic pulses at a predetermined repetition rate; radiating the generated pulses alternately at polarizations orthogonal to one another; receiving reflections of the orthogonally polarized radiated pulses; collecting values of the orthogonally polarized reflections corresponding to selected dimensions of a full scattering matrix, combining the values of the scattering matrix in accordance with a selected relationship; and detecting a wire at times when the combined scattering matrix values produce two copolarized null values that are essentially colocated near the equator of a sphere whose surface uniquely represents all possible polarization states.

In another aspect to achieve the objects, and in accordance with the purpose of the invention, the system for detecting radiant energy reflected by a length of wire comprises a system for detecting electromagnetic energy reflected by a length of wire; comprising a transmitter for generating electromagnetic pulses at a predetermined repetition rate; an antenna having a first portion for radiating electromagnetic pulses of a first polarization and having a second portion for radiating electromagnetic pulses of a second polarization orthogonal to the first polarization, the first portion having maximum sensitivity to the detection of reflected pulses of the first polarization, the second portion having maximum sensitivity to the detection of reflected pulses of the second polarization; a switch connecting the first and second portions of the antenna to the transmitter for radiating successive electromagnetic pulses of the first and second polarization; a first and second receiver connected to the first and second antenna portions, respectively; means for collecting values of successive orthogonally polarized reflected pulses corresponding to selected dimensions of a full scattering matrix; means for combining the collected values of the full scattering matrix; and means for detecting a wire at times when the combined values correspond to a predetermined null value and are indicative of an object at the same range and azimuth.

The accompanying drawings, which are incorporated in and constitute a part of this specification, illustrate one embodiment of the present invention, and together with the description serve to explain the principles of the invention.

DESCRIPTION OF THE PREFERRED EMBODIMENT

Figure 1:
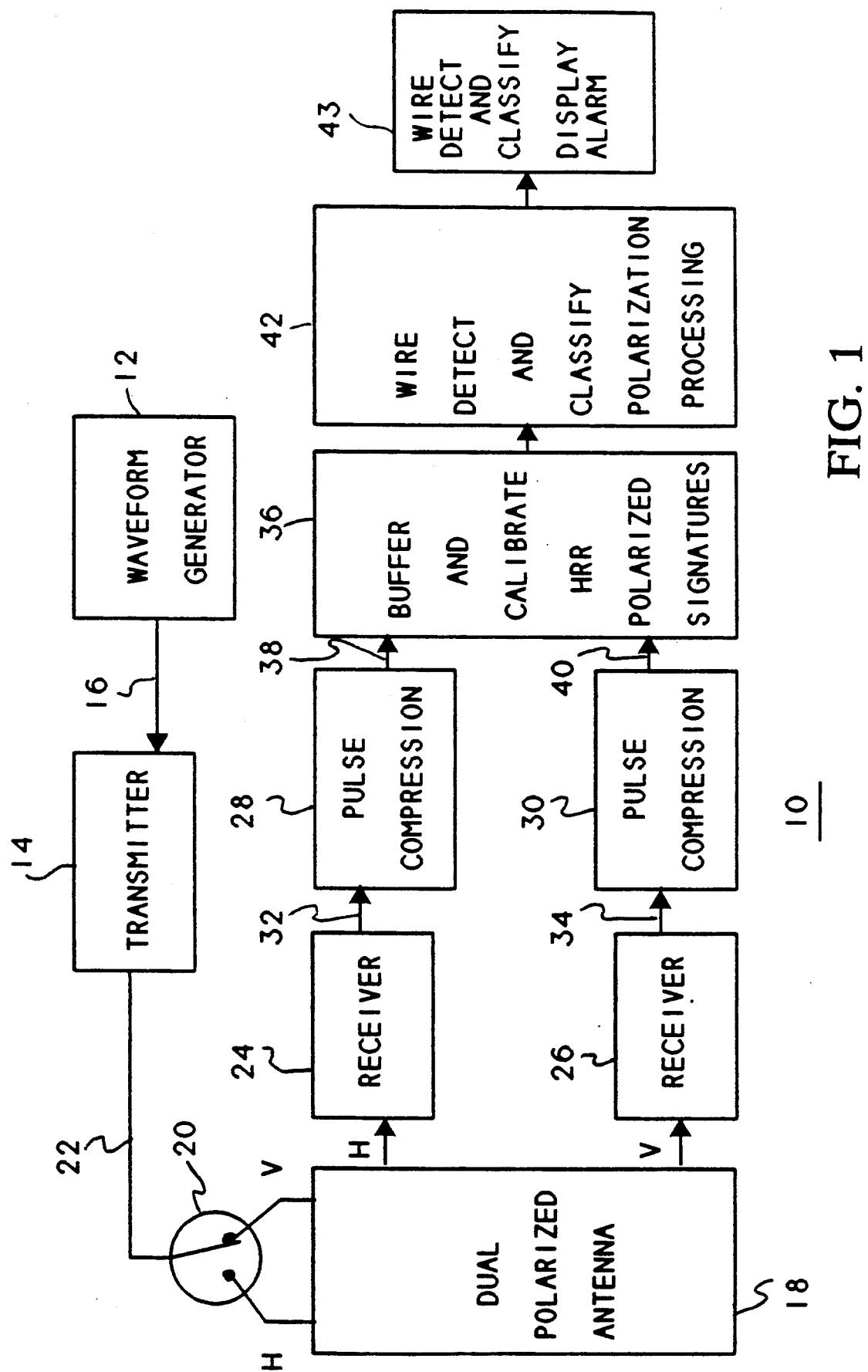
FIG. 1 is a schematic block diagram of a radar system for detecting wire in accordance with the present invention.

Referring to FIG. 1, a schematic block diagram of a high range resolution radar system capable of reliably detecting wire in accordance with the present invention is generally referred to as 10.

The system of the present invention comprises means for transmitting radiant energy having a frequency and interpulse period for providing high range resolution. As herein embodied and referring to FIG. 1, system 10 has a waveform generator 12 for generating a waveform or pulse having an amplitude modulation of a short time duration. A transmitter 14 is connected to output 16 of wave form generator 12 for outputting the generated pulses to a dual polarized antenna 18 through a switch 20. Switch 20, which is connected to output 22 of transmitter 14 operates at a predetermined frequency to radiate alternate generated pulses which are polarized orthogonal to one another. Although it is contemplated that adjacent pulses will be orthogonally polarized, they may be alternately polarized in various sequences according to the needs of practice. Dual polarized antenna 18 may be any well known type such as a plate having a first multitude of spaced elongate slots extending in one direction for radiating pulses with horizontal polarization, for example, and a second multitude of spaced elongate slots extending orthogonal to the first multitude of slots. For convenience of description one polarization of the dual polarized antenna will be referred to herein as horizontal polarization, and the orthogonally polarized pulses will be referred to as vertical polarization.

The system of the present invention comprises receiving means for sampling the dual polarized reflected energy; preferably at range intervals of between approximately 10 and 30 meters. Each range interval is then preferably divided into a multiplicity of range elements to obtain high resolution ranging.

As herein embodied, a receiver 24 is connected to a horizontally polarized portion of antenna 18, and a receiver 26 is connected to a vertical polarization portion of antenna 18. Preferably, the received electromagnetic pulses from receivers 24 and 26 are subjected to pulse compression as illustrated by boxes 28 and 30 connected to respective outputs 32 and 34 of the receivers.

In accordance with the invention, means are provided for collecting polarization dimensions corresponding to selected dimensions of a full polarization scattering matrix for each range element. As herein embodied, and again referring to FIG. 1, the values of the received echo signals are stored in appropriate buffers and calibrated as represented by box 36 connected at outputs 38 and 40 of pulse compressors 28 and 30 respectively. The values stored in buffer 36 correspond to a full scattering matrix for the reflected signals from both orthogonally polarized antenna portions.

In accordance with the invention means are provided for transforming the matrix corresponding to a full polarization matrix to a null matrix having a plurality of divisions corresponding to different polarization states. As herein embodied, and connected to an output of buffer and calibrator 36 is a calculating unit 42 for transforming the values of each full scattered matrix to a null matrix. The system of the invention also includes means governed by the null matrix for detecting and classifying wire; such as a display alarm or the like referenced at block 43.

Figure 2:
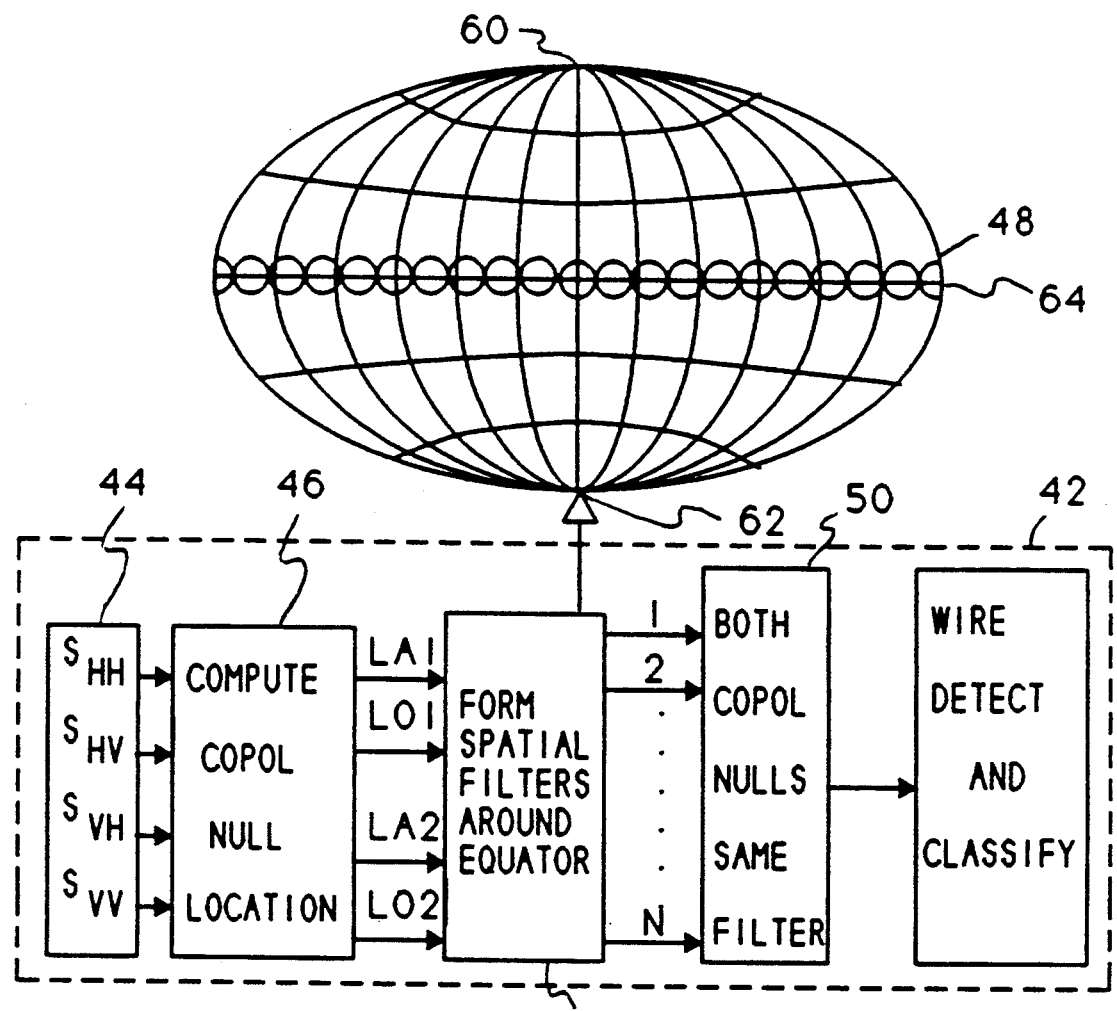
FIG. 2 is a more detailed schematic functional block diagram of the wire detection processing and classification function of FIG. 1.

Referring to FIG. 2, a more detailed diagram of transformation box 42 for polarization processing, classifying, and detecting wire, is shown. As illustrated in FIG. 2, complex numbers of a 2×2 matrix referred to at 44 which represent selected dimensions of a full polarization scattering matrix for echoes of the dual polarized pulses. The selected dimensions of a full scattering matrix of a dual polarized antenna of the present invention are as follows: $S_{HH}$, which is the complex signal (magnitude and phase) of a reflected pulse both radiated by the horizontally polarized antenna and received by receiver 24 connected to the horizontally polarized antenna,; $S_{HV}$ which is the complex signal of a reflected pulse radiated by the horizontally polarized antenna and received by receiver 26 connected to the vertically polarized antenna; $S_{VH}$, which is the complex signal of a reflected pulse radiated by the vertically polarized antenna and received by receiver 24 connected to the horizontally polarized antenna; and $S_{VV}$, which is the complex signal of a reflected pulse radiated by the vertically polarized antenna and received by receiver 26 connected to the vertically polarized antenna.

In accordance with the invention means are provided for transforming the matrix corresponding to a full polarization scattering matrix to a null matrix having a plurality of dimensions corresponding to different polarization states. As herein embodied, the complex signals of the above values, S are utilized at box 46 to compute null locations. Two copolarized nulls are computed for each range sample. The orientation angle and the ellipticity angle of the two computed copolarized nulls are calculated to determine their location relative to a horizontal and vertical polarized plane. The two calculated nulls are then filtered by spatial filters as indicated by box 48 to determine their relative values or position in the horizontal plane. When both copolarized nulls from a single range element are similar; and detected in the same spatial filter at block 50, the system detects a wire.

In the method of the present invention high range resolution polarimetric techniques are used to detect and classify wires from surrounding terrain features. The high range resolution feature of this method resolves the sampled range interval into multiple range elements while the polarimetric feature provides a complete scattering matrix for each of the resolved range elements. The method uses high range resolution to isolate radar scatterers and uses the increased dimensionality offered by the full polarization matrix to determine that an isolated scatterer is a wire. According to the method of the present invention, the polarization scattering matrix for a radar return is transformed to a null matrix. Nulls occur for polarizations where the backscattered wave is perfectly orthogonal to the radar's receiving antenna. The null polarizations which are often referred to as the copolarized or copol nulls exist in pairs that are independent of each other. Four of the five independent dimensions for the null matrix are represented by the two parameters that locate each of the two copol nulls on a well known Poincare Sphere (hereinafter discussed) while the fifth is represented by the total power in the matrix. In the method of the present invention the four location dimensions are used in addition to the normally used power. Specifically, the collected scattering matrix is transformed to a null matrix to get five dimensions in a domain conducive to polarization filtering. This polarization filtering of the present invention may be best understood by reviewing the properties of a polarization scattering matrix, as follows.

For a given radar frequency, the radar cross-section (RCS) of an object depends on its size, shape and composition, aspect angle and the polarization of the radar transmitting and receiving antenna. The manner in which the object transforms and radiates the incident polarization is completely described by the elements of a 2×2 matrix known as a polarization scattering matrix.

A general scattering matrix, S, contains four complex elements;

$$S = \begin{bmatrix} S_{11} & S_{12} \\ S_{21} & S_{22} \end{bmatrix}$$

where the subscripts 1 an 2 represent any pair of orthogonal polarizations. Two of the most common pairs used in polarimetric radars are linear and circular. The matrix notations for each is as follows:

LINEAR
$$S = \begin{bmatrix} S_{HH} & S_{HV} \\ S_{VH} & S_{VV} \end{bmatrix}$$

CIRCULAR
$$S = \begin{bmatrix} S_{RR} & S_{RL} \\ S_{LR} & S_{LL} \end{bmatrix}$$

Figure 3B:
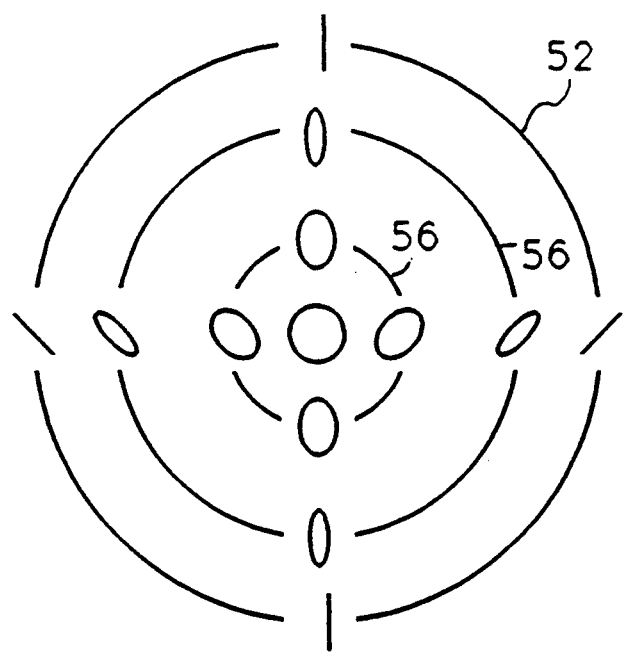
FIGS. 3A and 3B are diagrams of a Poincare Sphere for aiding in an explanation of the principles of the present invention.
Figure 3A:
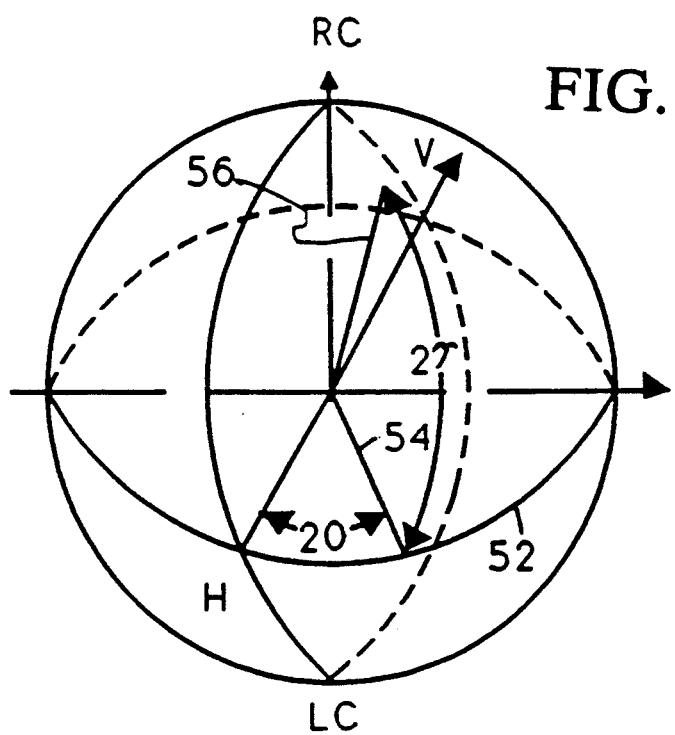

The subscripts H and V for the linear matrix represent horizontal and vertical polarizations, respectively, while the R and L for circular matrix represent right hand circular and left hand circular, respectively. The first subscript on each element denotes the transmitted polarization. Since each of the four elements of this matrix is complex, there are eight dimensions associated with it. For a monostatic radar where the transmitting and receiving antennas are colocated, reciprocity holds such that the off diagonal terms are identical to each other and the dimensionality is reduced from eight to six. The six dimensional scattering matrix includes absolute phase which corresponds to the location of the object along the line of sight. Since this absolute phase does not aid in describing the type of object, it is factored out of the polarization scattering matrix leaving a relative phase polarization matrix which describes the radar properties of the object with five independent dimensions. The relative phase polarization matrix may be defined using any element of the scattering matrix as the phase reference. When the HH element is used as the phase reference, the five independent dimensions of the linear matrix are:

$|S_{HH}|$ - magnitude of the $HH$ element $|S_{HV}|$ - magnitude of the $HV$ element $|S_{VV}|$ - magnitude of the $VV$ element $(\phi_{HV} - \phi_{HH})$ - relative phase between $HV$ and $HH$ elements $(\phi_{VV} - \phi_{HH})$ - relative phase between $VV$ and $HH$ elements A more detailed description of the present invention is described herein in connection with a description of the principles and operation of the system preferably described in connection with FIGS. 1 and 2. In describing the invention in more detail, reference will be made also to the well known Poincare Sphere of FIGS. 3A and 3B which provides a useful means for visualizing the polarization properties of an object and an Aitoff projection of FIG. 4 to aid in the understanding thereof.

Each polarization state is uniquely represented by a point on the surface of the sphere. The northern and southern hemispheres represent right hand circular polarization and left hand circular polarization, respectively. Poles RC and LC represent circular polarization, and equator 52 represents linear polarization. H indicates horizontal polarization at the center front /H of equator 52 and rear center V of the equator indicates vertical polarization. Longitudinal coordinates 54 of the polarization state location corresponds to twice orientation angle, $\theta$, while latitude coordinate 56 corresponds to twice the ellipticity angle, $\tau$. The transformation of the full scattering matrix to the null matrix, which involves locating the longitude and latitude of two null polarizations may be determined from the linear and circular matrix elements in accordance with the following relationships:

$$\text{Longitude} = \tan^{-1}\left\{ \frac{Im\ (U)}{Re\ (U)} \right\} \quad \text{(Equation 1)}$$

where
Im(U) is the imaginary part of the U and
Re(U) is the real part of U
and $$\text{Latitude} = \sin^{-1}\left\{ \frac{|U|^2 - 1}{|U|^2 + 1} \right\} \quad \text{(Equation 2)}$$

and U is defined in terms of the polarization ratio, p, as $$U = \frac{1 - ip}{1 + ip} \quad \text{(Equation 3)}$$

and p is defined in linear polarization matrix terms as $$p = \frac{-S_{HV} \pm (S_{HV}^2 - S_{VV}S_{HH})^{\frac{1}{2}}}{S_{HH}} \quad \text{(Equation 4)}$$

Using the linear polarization scattering matrix terms to solve Equation 4 yields two solutions for the polorization ratio which correspond to the two copol nulls. Applying both solutions for p to Equation 3 yields two solutions for U. When these two solution for U are applied to Equation 1 and 2 respectively, the corresponding longitude and latitude are obtained for each copol solution.

If the original polarization scattering matrix is circular, the following relationships can be used to convert the circular matrix elements to linear matrix elements and the above procedure can be used to convert the linear matrix elements to a longtitude and latitude location for each of the two copol nulls.

$$S_{HH} = S_{RL} + \frac{S_{LL} + S_{RR}}{2}$$

$$S_{VV} = S_{RL} - \frac{(S_{LL} + S_{RR})}{2}$$

$$S_{HV} = \frac{i}{2}(S_{LL} - S_{RR})$$

The longitude equals two times the orientation angle and the latitude equals two times the ellipticity. More comprehensive development of the above equations appears in a publication by Huynen, Jean richard, entitled "Phenomenological Theory of Radar Targets", Drukkerly Bronder—Offset N.V., 1970.

The ellipticity angle $\tau$ indicates whether the object is wirelike, elliptical or circular. The orientation angle $\theta$ indicates how the object is oriented relative to the polarization axes of radar antennas. The collection of the values of the full scattering matrix and the transformation of such values together with the classification of the nulls that are in the same spatial filter may be carried out by conventional means, such as a digital processing apparatus, for example.

An object having two similar dimensions would provide a scattering matrix where $S_{HH}$, $S_{VV}$, $S_{HV}$ and $S_{VH}$ would have similar values, each of which would be maximum in both the right hand and left hand circular polarization thus corresponding to a corresponding pole of Poincare's Sphere. An object having an elliptical configuration with a horizontal major axis, and a vertical minor axis, for example, would provide a scattering matrix where $S_{HH}$ would have a greater magnitude than $S_{VV}$; $S_{HV}$ and $S_{VH}$ would have a magnitude less than $S_{HH}$ and $S_{VV}$; using Poincare's Sphere as the analogy, would place an elliptical object between the equator and north and south poles of Poincare's Sphere. The exact latitude would depend on the relative size of the major and minor axis. The greater the difference in the axis dimension, the closer to the equator. The particular latitude would be either in the northern or southern hemisphere. An object having a straight configuration, such as a wire, would provide a scattering matrix where $S_{HH}$ would have maximum reflectivity for a horizontal wire and zero reflectivity for $S_{VV}$, also, $S_{HV}$ and $S_{VH}$ would be transparent to a horizontal wire. If a wire should be vertical, for example, then $S_{VV}$, would have maximum reflectivity and $S_{HH}$ would be transparent. Also, $S_{VH}$ and $S_{HV}$ would have little or no magnitude. Of course, for a polar object orientation would have little or no effect on the magnitudes of the scattered matrix. The greater the difference between the major and minor axis of an ellipse, the greater the affect that orientation would have on the magnitude of the scattered matrix. The orientation of a wire relative to the dual orthogonal polarized beams would have almost a linear effect on the magnitude of the scattered matrix. For example, if the wire were oriented at a 45 degree angle to the horizontal and vertical polarization, the magnitude of $S_{HH}$ and $S_{VV}$ would be practically the same, but of less than maximum reflectivity. Similarly, the values of $S_{HH}$ and $S_{VH}$ would be of magnitude similar to each other and to $S_{HH}$ and $S_{VV}$ the scattered matrix adjacent pulses of orthogonal polarization, if having the configuration of a wire irrespective of orientation would combine to produce a matrix having two null values. These null or zero values would be located on or near the equator of Poincare's Sphere. The orientation of the wire relative to the radar antenna's polarization axis would merely move the values around the equator.

A similar set of independent dimensions exist for a circular matrix. Further comment about the circular matrix is unnecessary since it is related to the linear matrix by a simple transformation. In fact, scattering due to any set of orthogonal polarizations can be obtained by properly transforming the scattering matrix collected to any other set of orthogonal polarizations.

The two copol nulls for long, thin objects such as wires are colocated and appear at the equator. Since these copol nulls are oriented 90 degrees relative to the wire orientation, they appear in front when the wire is oriented vertically. They are more to the side when the wire is oriented at a 45 degree angle and to the rear when the wire is oriented horizontally. Copol nulls near the equator represent thin ellipses. As the copol nulls move away from the equator they represent fuller and fuller ellipses until they reach the pole where they represent circles. In other words, all points along a given latitude circle indicate the same ellipticity angle while all points along a given longitude indicate the same orientation angle.

Figure 4:
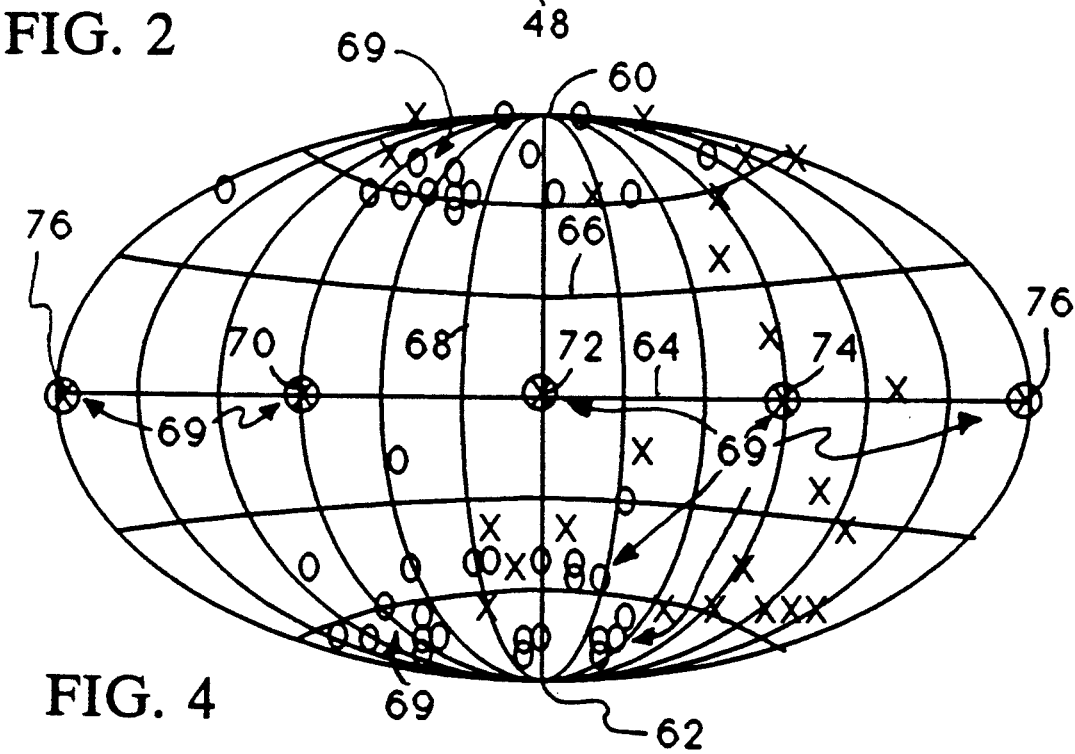
FIG. 4 is a diagram of a Aitoff projection for illustrating copolarization characteristics for different shaped objects including wires in accordance with the present invention.

Representing the surface of the sphere with a two-dimensional format allows convenient observation of copol null characteristics. Aitoff's projection which is primarily used in cartography is shown in FIG. 4. It suppresses one dimension, total power, but displays the other four as point pairs in a common format. Top and bottom 60 and 62 of this two-dimensional display format represents the poles of the sphere while the center 64 of the display format represents the equator of the sphere. Latitude 66 and longitude 68 are segmented into thirty degree increments. The center 180 degrees of longitude 68 represents the front of the Poincare Sphere while the 90 degrees of longitude to the far right represents the right rear quadrant of the sphere and the 90 degrees of longitude to the far left represents the left rear quadrant of the sphere. An "X" indicates the location of one of the copol null pairs while an "O" indicates the location of the other.

Examples 69 of copol null distributions obtained using this display format are shown for treelines in FIG. 4. Other terrain types such fields and trees have similar distributions. These distributions represent data obtained from several samples where different terrain samples correspond to different areas on the ground. A high range resolution profile is formed for each sample and the copol nulls for the three highest power scatterers of each range profile wire plotted in FIG. 4. The copol nulls for terrain scatterers as a group tend to congregate at the poles and the two copol nulls for any individual scatterer can appear anywhere within the group. On the other hand, the two copol nulls for separate wires are on equator 64 for each of four separate wires 70, 72, 74, and 76 are at the same location and spaced intervals on equator 64. The spaced location of copol nulls for the four separate wires indicates that these are oriented at different angles.

In summary, the radar samples the terrain in range intervals, such 10–30 meters, for example, resolves these intervals into multiple range elements (32–128) and collects a full polarization scattering matrix for each of the resolved range elements. The wire detection and classification process of the present invention transforms the collected polarization matrix to the null matrix and calculates the location of its two copolarized or copol nulls on the Poincare's Sphere. Each point on the surface of the Poincare's Sphere represents a unique polarization state. There are five independent dimensions associated with the polarization matrix. The wire detection and classification process deemphasizes the use of signal power and emphasizes the use of the other four dimensions of the null matrix. These four dimensions are represented by the two latitudes and the two longitudes which locate the two copol nulls on the Poincare's Sphere. The copol nulls for a wire are very unique in that they are colocated and their location is on the equator. The exact location of the copol nulls on the equator depend on the orientation of the wire with respect to the polarization axis of the radar. Spatial filters are provided which cover the entire equator of the Poincare's Sphere. Wires are detected and classified as such when both of the copol nulls from a high range resolution element fall in the same spatial filter.

What is claimed is:

1. A method for detecting electromagnetic energy reflected by a length of wire, comprising:
   generating electromagnetic pulses at a predetermined repetition rate;
   radiating the generated pulses alternately at polarizations orthogonal to one another;
   receiving reflections of the orthogonally polarized radiated pulses;
   collecting values of the orthogonally polarized reflections corresponding to selected dimensions of a full scattering matrix, combining the values of the scattering matrix in accordance with a selected relationship; and
   detecting a wire at times when the combined scattering matrix values produce two copolarized null values that are essentially colocated near the equator of a Poincare Sphere having a surface representing all possible polarization states.

2. The method of claim 1 wherein the step of collecting values of the full scattering matrix further comprises the steps of collecting a first value corresponding to a pulse radiated and received by a first polarized antenna portion, collecting a second value corresponding to a pulse radiated and received by a second polarized antenna portion orthogonal to the first polarized antenna portion, collecting a third value corresponding to a pulse radiated by the first polarized antenna portion and received by the second polarized antenna portion, and collecting a forth value corresponding to a pulse radiated by the second polarized antenna portion and received by the first polarized antenna portion.

3. The method of claim 2 wherein the step of combining the values according to a predetermined relationship comprises the substep of:
   determining a first dimension corresponding to twice the angle between a null and polar configuration defined as $$\sin^{-1} \frac{|U|^2 - 1}{|U|^2 + 1}$$

where $$U = S \frac{1 - ip}{1 + ip} \text{ and}$$

$p$ is defined in linear polarization matrix terms as $$p = -S_{HV} \pm \frac{(S_{HV}^2 - S_{VV}S_{HH})^{\frac{1}{2}}}{S_{HH}}.$$

4. The method of claim 3 wherein the step of combining the values according to a predetermined relationship further comprises the substep of determining a second dimension corresponding to twice the angle between a reference reflectivity and actual reflectivity corresponding to an orientation of an object defined as:

$$\tan^{-1} \left\{ \frac{Im(U)}{Re(U)} \right\}, \text{ and}$$

detecting a wire at times when the first dimension is zero and the second dimension coincides with the first dimension.

5. The method of claim 1 wherein the step of generating the electromagnetic pulses at a predetermined repetition rate comprises generating the pulses corresponding to range intervals between approximately 10 and 30 meters, and wherein said method for detecting electromagnetic energy further comprises the step of dividing each range interval into a plurality of range elements.

6. The method of claim 5 wherein the step of collecting values of the full scattering matrix further comprises the steps of collecting a first value corresponding to a pulse radiated and received by a first polarized antenna portion, collecting a second value corresponding to a pulse radiated and received by a second polarized antenna portion orthogonal to the first polarized antenna portion, collecting a third value corresponding to a pulse radiated by the first polarized antenna portion and received by the second polarized antenna portion, and collecting a fourth value corresponding to a pulse radiated by the second polarized antenna portion and received by the first polarized antenna portion.

7. The method of claim 1 wherein the step of combining the values according to a predetermined relationship comprises the substep of:
   determining a first dimension corresponding to twice the angle between a null and polar configuration defined as $$\sin^{-1} \frac{|U|^2 - 1}{|U|^2 + 1}$$

where $$U = S \frac{1 - ip}{1 + ip} \text{ and}$$

$p$ is defined in linear polarization matrix terms as $$p = -S_{HV} \pm \frac{(S_{HV}^2 - S_{VV}S_{HH})^{\frac{1}{2}}}{S_{HH}}.$$

8. The method of claim 7 wherein the step of combining the values according to a predetermined relationship further comprises the substep of determining a second dimension corresponding to twice the angle between a reference reflectivity and actual reflectivity corresponding to an orientation of an object defined as:

$$\tan^{-1}\left(\frac{Im(U)}{Re(U)}\right); \text{ and}$$

detecting a wire at times when the first dimension is zero and the second distance coincides with the first dimension.

9. A system for detecting radiant energy reflected by a length of wire; comprising:
   a transmitter for generating electromagnetic pulses at a predetermined repetition rate;
   an antenna having a first portion for radiating the generated pulses of a first polarization and having a second portion for radiating the generated pulses of a second polarization orthogonal to the first polarization, the first portion having maximum sensitivity to the detection of reflected pulses of the first polarization, the second portion having maximum sensitivity to the detection of reflected pulses of the second polarization;
   a switch connecting the first and second portions of the antenna to the transmitter for radiating successive electromagnetic pulses of the first and second polarization;
   a first and second receiver connected to the first and second antenna portions, respectively;
   means for collecting values of successive orthogonally polarized reflected pulses corresponding to selected dimensions of a full scattering matrix;
   means for combining the collected values of the full scattering matrix according to a predetermined relationship; and
   means for detecting a wire at times when the combined values correspond to a predetermined null value and are indicative of an object at the same range and azimuth.

10. The system of claim 9 wherein the means for collecting values corresponding to selected dimensions includes means for collecting a first value corresponding to a pulse radiated and received by a first polarized antenna portion, a second value corresponding to a pulse radiated and received by a second polarized antenna portion orthogonal to the first polarized antenna portion, a third value corresponding to a pulse radiated by the first polarized antenna portion and received by the second polarized antenna portion, and a fourth value corresponding to a pulse radiated by the second polarized antenna portion and received by the first polarized antenna portion.

11. The system of claim 9 wherein the means for generating pulses comprises means for generating the electromagnetic pulses at a predetermined repetition rate corresponding to range intervals between approximately 10 and 30 meters, and means for dividing each range interval into a plurality of range elements.

12. The system of claim 9 wherein the means for combining the values according to a predetermined relationship comprises means for determining a first dimension corresponding to twice the angle between a null and polar configuration defined as:

$$\sin^{-1}\frac{|U|^2 - 1}{|U|^2 + 1}$$

where $$U = S\frac{1 - ip}{1 + ip} \text{ and}$$

$p$ is defined in linear polarization matrix terms as $$p = -S_{HV} \pm \frac{(S_{HV}^2 - S_{VV}S_{HH})^{\frac{1}{2}}}{S_{HH}}.$$

* * * * *